Figure 1:
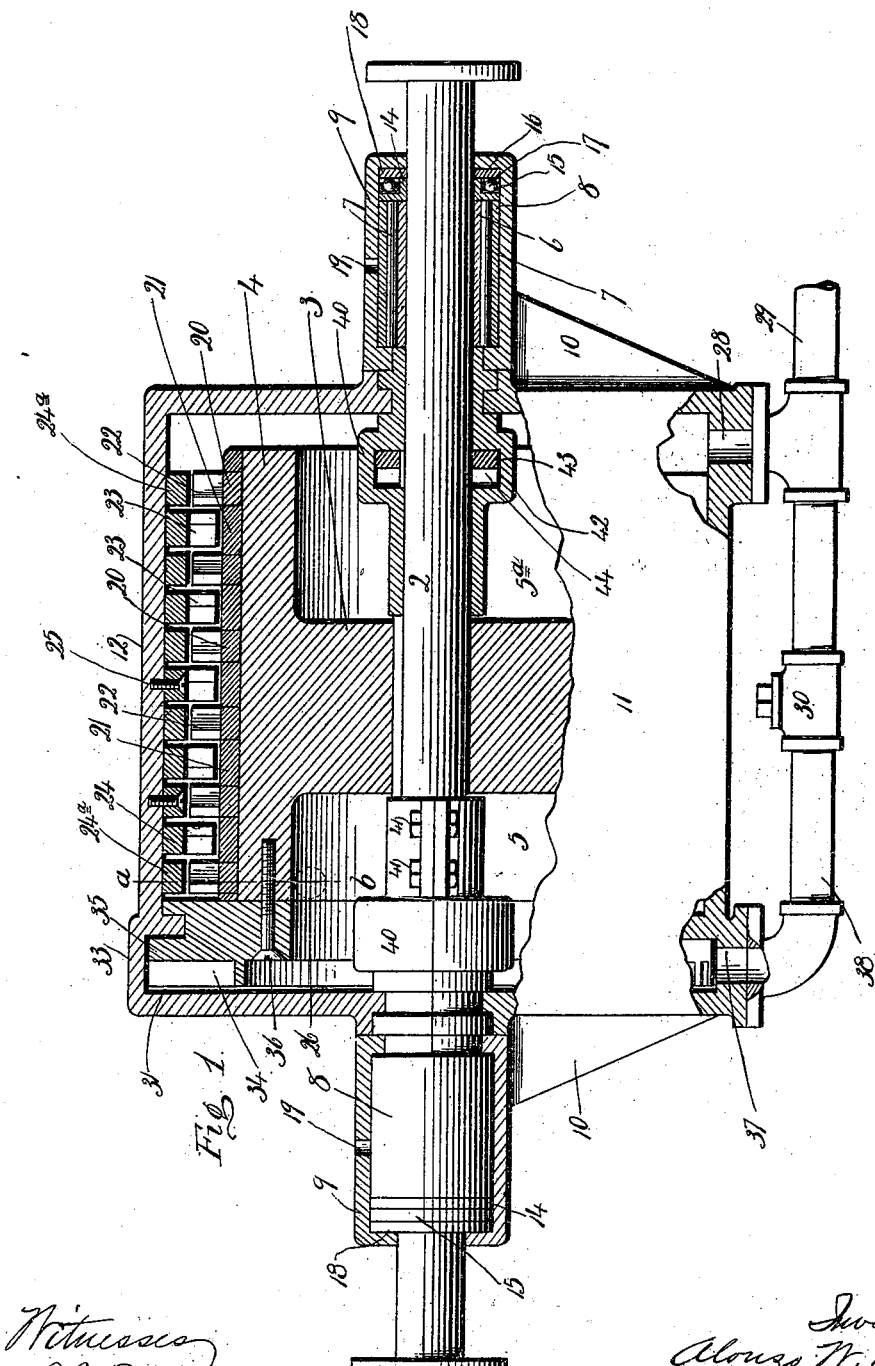

A. W. BENNETT.
TURBINE.
APPLICATION FILED DEC. 18, 1909.

979,735.

Patented Dec. 27, 1910.
2 SHEETS—SHEET 1.

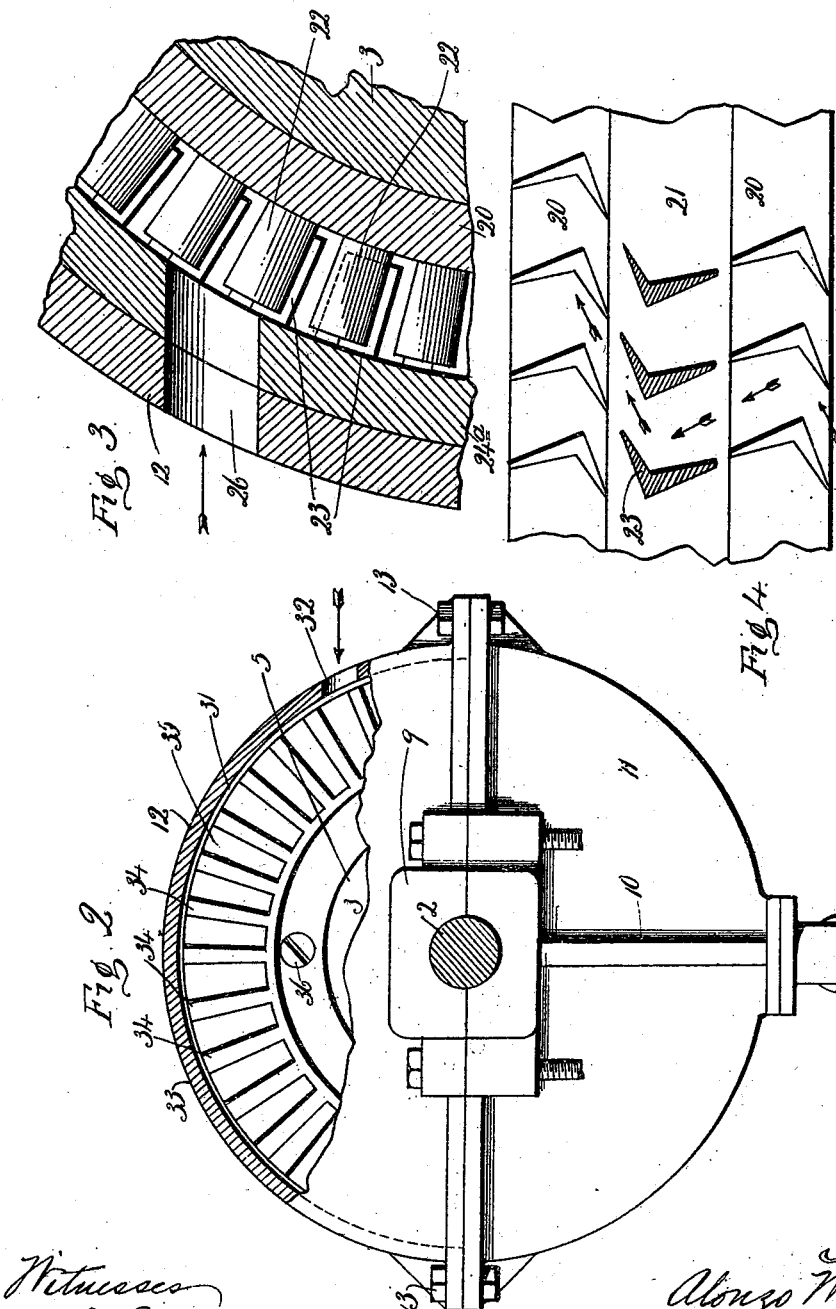

UNITED STATES PATENT OFFICE.

ALONZO W. BENNETT, OF HAMDEN, CONNECTICUT.

TURBINE.

979,735.    Specification of Letters Patent.    Patented Dec. 27, 1910.

Application filed December 18, 1909. Serial No. 533,820.

*To all whom it may concern:*

Be it known that I, ALONZO W. BENNETT, a citizen of the United States, residing at Hamden, in the county of New Haven and State of Connecticut, have invented a new and useful Improvement in Turbine-Engines; and I do hereby declare the following, when taken in connection with the accompanying drawings and the letters of reference marked thereon, to be a full, clear, and exact description of the same, and which said drawings constitute part of this specification, and represent, in—

Figure 1 a broken view partly in side elevation and partly in vertical longitudinal section of a turbine engine constructed in accordance with my invention. Fig. 2 a view thereof partly in section and partly in end elevation looking from left to right. Fig. 3 a broken sectional view on an enlarged scale on the line $a$—$b$ of Fig. 1. Fig. 4 a view in the nature of a diagram showing the relative arrangement of the angular buckets respectively mounted upon the piston and applied to the inner face of the steam-chest.

My invention relates to an improved turbine engine designed with particular reference to driving steam launches and steam automobiles, the object being to produce a simple, compact and durable engine constructed with particular reference to securing a very high speed, to realizing the maximum of efficiency from the steam, to reducing the amount of oil none of which is used in the cylinder, to dispensing with the regulator and the steam valves heretofore employed in turbine-engines, and to applying the power of the steam at its very first entrance into the cylinder so that the engine is adapted to start with a load instead of waiting until it gets up speed as is necessary with the engines now in common use.

With these ends in view my invention consists in certain details of construction and combinations of parts as will be hereinafter described and pointed out in the claims.

In carrying out my invention as herein shown, I employ a shaft 2 upon which I mount a rotary piston 3 having a circular rim 4 and deep concentric chambers 5 and 5ª at its ends, the latter forming a chamber for the exhaust-steam. The said shaft 2 is journaled at its ends in sleeves 6 surrounded by long rollers 7 inclosed between the said sleeves, and larger sleeves 8 located within housings 9 supported by ribs or brackets 10 cast integral with the lower half 11 of the cylinder or steam-chest the upper half 12 of which is secured to it in the usual manner by bolts 13. To provide for the end-thrust of the shaft 2 the outer ends of the sleeves 6 and 8 and the outer ends of the rollers 7 are abutted against angle rings 14 the angles of which receive rings 15 having a circular series of perforations 16 containing anti-friction balls 17, interposed between and running upon the said rings 14 and washers 18, the latter being located in the extreme outer ends of the housings 9 which are provided with openings 19 for oiling. The longitudinal thrust of the shaft 2 in either direction is taken by the ball-bearing devices just described.

Upon the heavy circular rim 4 of the piston 3, I mount a series of bucket-carrying rings 20 and bucket-spacing rings 21, these being arranged alternately and by preference shrunk upon the said rim 4 though I do not limit myself to securing them in place in any particular way. The said bucket-carrying rings 20 are provided with integral radially projecting angular buckets 22 extending outward between corresponding angular buckets 23 formed integral with and extending radially inward from semi-circular bucket-carrying rings 24 attached by screws 25 to the inner faces of the upper and lower sections 12 and 11 of the steam-chest to which live steam is admitted through a port 26 in the upper section 12. The buckets 22 moving with the piston are arranged to face in the opposite direction from the buckets 23 stationary with the steam-chest and vice versa, as shown in Fig. 4 of the drawings, so that the steam passing through them is deflected at substantially a right angle as shown by the arrows on the said figure.

Between the bucket-carrying rings 24 I locate semi-circular filling-rings 24ª which stand opposite or face the buckets 22 of the bucket-carrying rings 20, just as the stationary buckets 23 stand opposite or face the bucket-spacing rings 21 mounted upon the piston as aforesaid. By the employment of the rings 21 and 24ª in the manner described, the spaces between the buckets are contracted, whereby the steam is compelled to flow through more constricted passages and made more effective by being prevented from prematurely expanding.

Live steam entering through the port 26 formed in the upper part 12 of the steam-chest and in adjacent ring 24ª, acts at once upon the buckets 22 formed integral with the ring 20 at the extreme left hand end of the piston. By these buckets 22 the steam is deflected into the stationary buckets 23 formed integral with the adjacent pair of semi-circular rings 24, from which it is deflected to the adjacent buckets 22 carried by the piston and so on from left to right through the tortuous passages formed by the oppositely arranged buckets 22 and 23 until the steam now expanded finds its way into the exhaust-chamber 5ª and leaves the engine through the exhaust-port 28 and thence flows into the exhaust-pipe 29. At this time, as will be understood, the check valve 30 is closed to prevent the exhaust-steam from entering the piston-reversing chamber 31 formed by enlarging the left hand end of the steam-chest as will be described later on. It will be understood also that the buckets 23 being stationary with the steam-chest, form points of purchase against which the steam acts in imparting rotary movement to the piston 3.

To reverse the engine, I admit steam into a port 32 (Fig. 2), formed in the upper part 12 of the steam-chest. This part opens into the steam-chamber 31 formed in the enlargement 33 of the left hand of the said steam-chest and located in a plane at a right angle to the axis thereof. Entering the said chamber 31 the steam acts upon a series of radial blades 34 located upon the outer face of a vertically arranged disk 35 fastened by screws 36 to the left hand edge of the rim 4 of the piston 3, as clearly shown in Fig. 1, whereby the piston 3 is reversed in rotation. The steam so used passes from the chamber 31 through an exhaust-port 37 into an exhaust-pipe 38 separated from the exhaust-pipe 39 by the check-valve 30 which is left open at this time to form a connection between the pipe 34 and the pipe 29.

To prevent steam from escaping from the steam-chest around the journals of the shaft 2, I employ two two-part bushings 40 the parts of which are secured together by bolts 41, and which extend between the bottom walls of the chambers 5 and 5ª in the piston and the housings 9 aforesaid, passing through the ends of the steam-chest. These bushings are enlarged at points within the said steam-chest to form annular fan-chambers 42 encircling the shaft 2 and containing rings 43 keyed to the said shaft and carrying radially arranged inwardly extending blades 44 functioning as fans, since when the shaft revolves, they sweep through the said chambers 42 so as to produce a sufficient inward pressure of air to prevent the steam from working outward.

I claim:—

1. In a turbine engine, the combination with a steam-chest, of a rotary piston formed at one end with a deep concentric exhaust-chamber, a series of rings mounted upon the piston in spaced arrangement, buckets projecting outwardly from the said rings, a series of rings applied in spaced arrangement to the inner wall of the steam-chest, buckets projecting from the rings last mentioned inwardly between the buckets carried by the said rings on the piston, a steam passage for the entrance of steam directly into the outer row of buckets carried by the piston from which buckets the steam passes directly into the outer row of buckets carried by the chest, and so on from one end of the system of buckets to the other, and means located at the end of the piston opposite from the said exhaust-chamber, for reversing the direction of the piston.

2. In a turbine engine, the combination with a steam-chest, of a rotary piston having a concentric exhaust-chamber at one end, a series of bucket-carrying rings mounted upon the piston, buckets carried by the said rings, spacing-rings located between the said bucket-carrying rings, a series of bucket-carrying rings applied to the inner face of the steam-chest, buckets carried by the rings last mentioned and extending into the spaces between the buckets carried by the piston, blocking-rings located between the bucket-carrying rings of the steam-chest, a steam passage for admitting steam directly into the buckets at the end of the piston opposite its exhaust-chamber, and means located at the end of the piston opposite its exhaust-chamber, for reversing the piston.

3. In a turbine engine, the combination with a steam-chest having at one end a piston-reversing steam-chamber located at a right angle to the axis of the chest, of a rotary piston, steam buckets carried by the piston and steam-chest and arranged in alternation for the progressive passage through them from one end to the other of live steam, a head secured to one end of the piston and extending into the said piston-reversing chamber of the chest and provided with radially arranged blades, and steam passages leading into and out of the said piston-reversing chamber, whereby the rotation of the piston may be reversed.

4. In a rotary steam engine, the combination with the steam chest thereof, of a rotary piston located therein and having its opposite ends recessed, a shaft for the said piston, steam buckets arranged in alternating rows respectively carried by the piston and steam-chest, steam passages for the introduction of steam into one end of the system of buckets through which it passes to the other end thereof in actuating the rotary piston, housings mounted upon the shaft and containing fan-chambers, and fans mounted upon the said shaft and located in the said fan-chambers for the production of inward air pressure within the ends of the chest around the bearings of the shaft for preventing the escape of steam.

In testimony whereof, I have signed this specification in the presence of two subscribing witnesses.

ALONZO W. BENNETT.

Witnesses:
JAMES E. SCOTT,
HENRY H. RICE.